United States Patent
Leung et al.

(10) Patent No.: US 7,742,063 B2
(45) Date of Patent: Jun. 22, 2010

(54) EFFICIENT AND HIGH SPEED 2D DATA TRANSPOSE ENGINE FOR SOC APPLICATION

(75) Inventors: Ho-Ming Leung, Cupertino, CA (US); Gary Chang, San Jose, CA (US); Wern-Yan Koe, Cupertino, CA (US)

(73) Assignee: LSI Corporation, Milpitas, CA (US)

( * ) Notice: Subject to any disclaimer, the term of this patent is extended or adjusted under 35 U.S.C. 154(b) by 915 days.

(21) Appl. No.: 11/176,040

(22) Filed: Jul. 7, 2005

(65) Prior Publication Data
US 2007/0009181 A1 Jan. 11, 2007

(51) Int. Cl.
G09G 5/00 (2006.01)
(52) U.S. Cl. ............... 345/649; 345/656; 345/657; 345/658; 345/559
(58) Field of Classification Search ........... 345/649, 345/656–658, 559
See application file for complete search history.

(56) References Cited

U.S. PATENT DOCUMENTS

| 5,412,768 | A | * | 5/1995 | Ozaki | 345/585 |
|---|---|---|---|---|---|
| 5,479,525 | A | * | 12/1995 | Nakamura et al. | 382/297 |
| 5,670,982 | A | * | 9/1997 | Zhao | 345/658 |
| 5,793,378 | A | * | 8/1998 | Truong et al. | 345/649 |
| 5,912,995 | A | * | 6/1999 | He | 382/297 |
| 6,104,843 | A | * | 8/2000 | Nakashima | 382/305 |
| 6,127,999 | A | * | 10/2000 | Mizutani | 345/619 |
| 6,271,929 | B1 | * | 8/2001 | Zhao | 358/1.18 |
| 6,275,622 | B1 | * | 8/2001 | Krtolica | 382/296 |
| 6,330,374 | B1 | * | 12/2001 | Yamaguchi et al. | 382/297 |
| 6,400,851 | B1 | * | 6/2002 | Shih | 382/297 |
| 6,496,192 | B1 | * | 12/2002 | Shreesha et al. | 345/540 |
| 6,674,443 | B1 | * | 1/2004 | Chowdhuri et al. | 345/557 |
| 6,697,081 | B1 | * | 2/2004 | Ito | 345/619 |
| 2003/0080963 | A1 | * | 5/2003 | Van Hook et al. | 345/501 |

* cited by examiner

*Primary Examiner*—M Good Johnson
(74) *Attorney, Agent, or Firm*—Christopher P. Majorana, PC

(57) ABSTRACT

An apparatus comprising a buffer circuit, a rotation circuit and a memory. The buffer may be configured to store original image data in one or more sub-matrices. The rotation circuit may be configured to (i) produce rotated data and (ii) store the rotated data in a transposed matrix. The memory may be configured to position the rotated data in the transposed matrix. The transposed matrix comprises final image data rotated by a predetermined angle from the original image data.

16 Claims, 4 Drawing Sheets

EFFICIENT AND HIGH SPEED 2D DATA TRANSPOSE ENGINE FOR SOC APPLICATION

FIELD OF THE INVENTION

The present invention relates to a data transposition generally and, more particularly, to an efficient and high speed 2D data transpose engine suitable for a system on a chip (SOC) application.

BACKGROUND OF THE INVENTION

Multi-media integrated circuits (ICs) generally need to transpose a large amount of 2D data. High definition (HD) JPEG pictures taken from a camera need to be rotated before being displayed by a DVD recorder/player. Optical discs, such as Blue-Ray or HD-DVD, have 2D error correction for a data stream. Data is stored in memory in an order defined by the bitstream. However, the data needs to be accessed in column order.

Conventional approaches tend to either use embedded processors to move the data around or to implement complicated dedicated hardware to rotate the data in a matrix. The software approach implemented in an embedded processor is slow. The amount of dedicated hardware tends to grow exponentially with the size of the data in the matrix.

There are several applications which need to transpose a 2D data matrix at a high speed. One such application includes image rotation. With image rotation, millions of pixels of a still image are captured by a camera. If an image is taken with the camera rotated 90 degrees, then the image needs to be rotated before being shown on a display monitor. The rotation of an image is normally done by a DVD player/recorder. Such a rotation has to be completed within a reasonable time, often less than 1 second. As the resolution of cameras increases, additional dedicated hardware is needed to meet predetermined performance goals.

Another conventional approach involves optical data error correction. Such an approach receives data from the optical disc, such as blue ray or an HD DVD system. The received data needs error correction (ECC) to be performed. Part of the ECC process involves mathematical operations based on data columns, as opposed to an operation which is based on data stream order. Graphic data manipulation includes graphic data which needs a rotation operation.

In previous generations of DVD systems, the rotation operation was performed by an embedded processor where data is rotated by software. In next generation DVD systems, a hardware rotation engine is needed to support a high speed rotation for a large amount of data on the fly. However, rotation data needs to read data from the same column position. In older generation chips, multi-port random access memories (RAMs) or registers with hardwired multiplexers were used. The use of multi-port RAMs or registers with hardwired multiplexers is not practical as the size of a data matrix continues to increase, often exponentially.

It would be desirable to provide a method and/or apparatus for an efficient and/or high speed two dimensional data transpose engine for a SOC in a manner that may be implemented in a low cost and/or reduced size integrated circuit.

SUMMARY OF THE INVENTION

The present invention concerns an apparatus comprising a buffer circuit, a rotation circuit and a memory. The buffer may be configured to store original image data in one or more sub-matrices. The rotation circuit may be configured to (i) produce rotated data and (ii) store the rotated data in a transposed matrix. The memory may be configured to position the rotated data in the transposed matrix. The transposed matrix comprises final image data rotated by a predetermined angle from the original image data.

The objects, features and advantages of the present invention include providing a method and/or apparatus that may (i) be implemented at a low cost, (ii) need only a small amount of dedicated hardware, (iii) provide a high speed pipelined operation, and/or (iv) use an existing memory approach (e.g., a frame buffer) without the need for additional memory.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
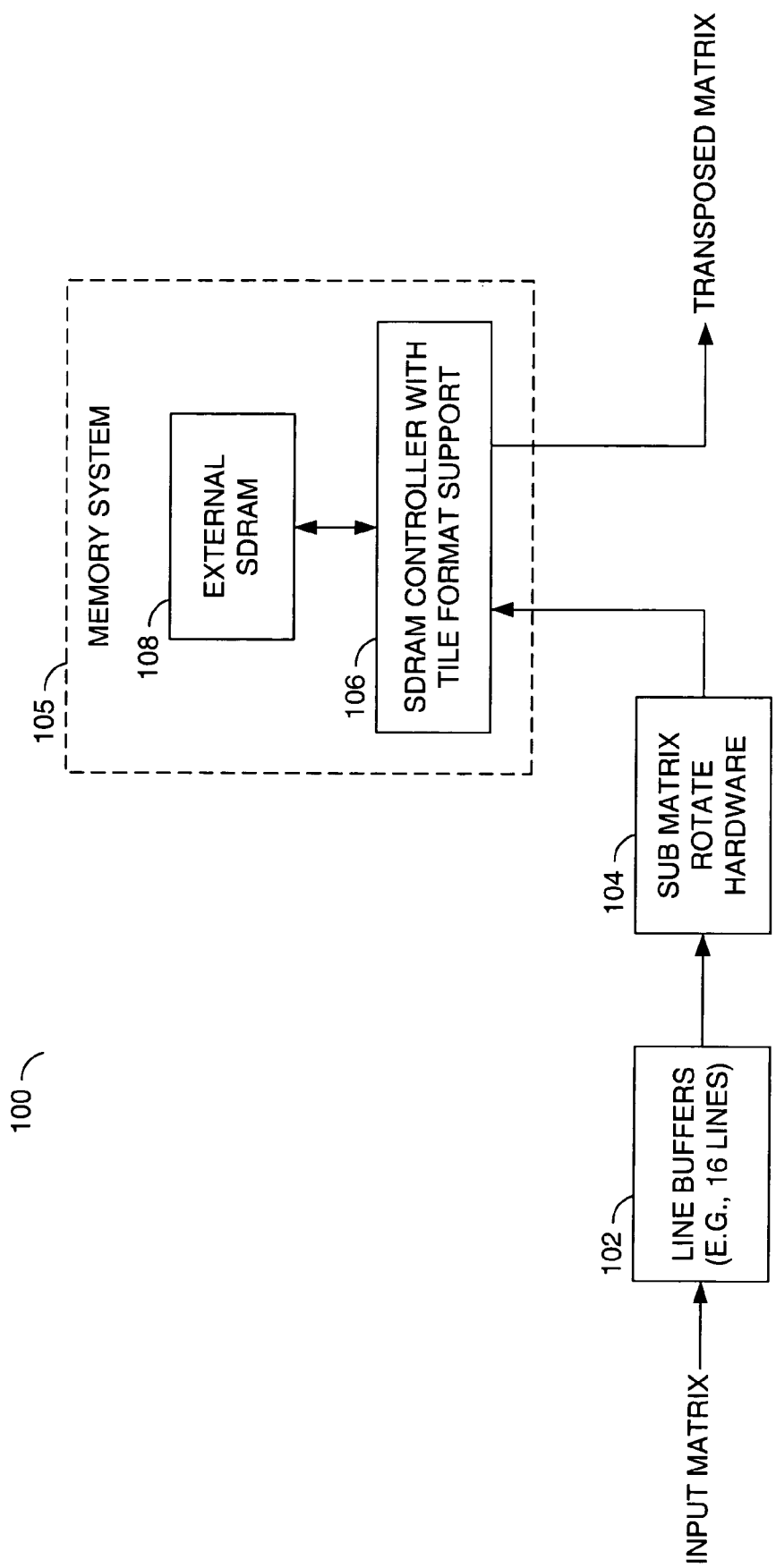
FIG. 1 is a system illustrating the present invention.

Referring to FIG. 1, a system 100 illustrating the present invention is shown. The system 100 generally comprises a block (or circuit) 102, a block (or circuit) 104 and a block (or circuit) 105. The circuit 102 may be implemented as a line buffer circuit. The circuit 104 may be implemented as a sub-matrix rotation (or rotator) circuit. The circuit 105 may be implemented as a memory. The memory circuit 105 generally comprises a memory controller 106 and a memory array 108. The memory controller 106 may be implemented as a synchronous dynamic random access memory (SDRAM) controller. The memory array 108 may be implemented as an array of SDRAM memory cells. The memory array 108 may include a number of addressable pages (or banks). The memory circuit 108 may be implemented as either an external or an internal SDRAM memory. The SDRAM controller 106 may generate a signal (e.g., TRANSPOSED_MATRIX).

Figure 2:
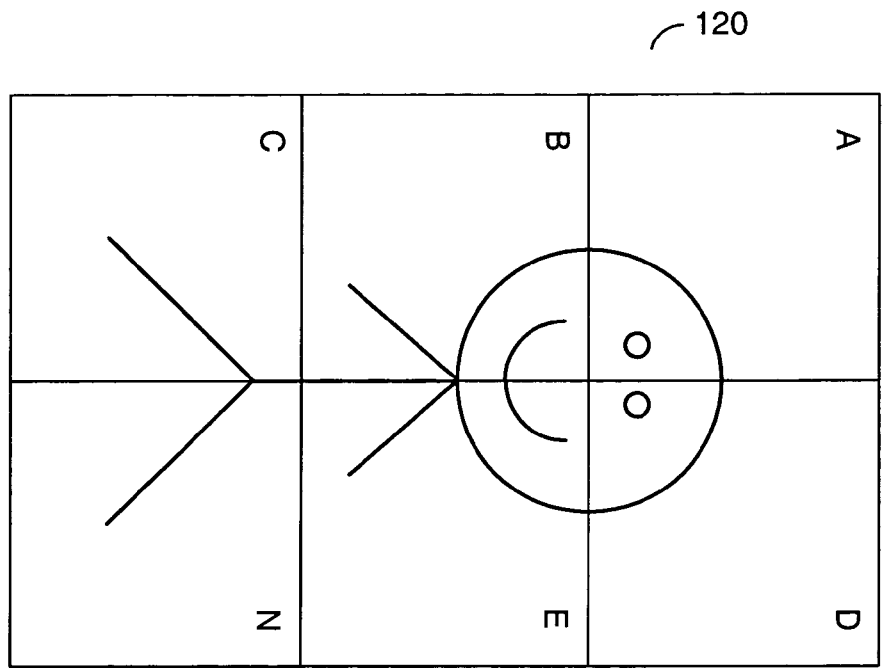
FIG. 2 illustrates a sub-matrix of original data.

Referring to FIG. 2, an original matrix 120 image of two dimensional data (e.g., original image data) is illustrated. The original image data comprises a number of lines in the original matrix 120. The original matrix 120 generally comprise a number of sub-matrices A-N. The system 100 generally divides the rotation operation into 3 parts. The rotation operation of the original image data in the original matrix 120 may be executed by the line buffer circuit 102, the sub-matrix rotation circuit 104 and the memory circuit 105. The line buffer circuit 102 may be configured to store the input data before presenting the input data to the sub-matrix rotation circuit 104. In general, the line buffer circuit 102 stores enough lines of the input data 120 for the sub-matrix rotation circuit 104 to rotate a small sub-matrix. The number of lines implemented on the line buffer circuit 102 may depend on the size of the sub-matrix rotation circuit 104. If the sub-matrix rotation circuit 104 works on a sub-matrix of 16×16 bytes, then 16 lines may be implemented in the line buffer circuit 102. The particular size of the sub-matrix rotation circuit 104 may be varied to meet the design criteria of a particular implementation.

The dedicated sub-matrix rotation circuit 104 may be implemented as a plurality of registers, a plurality of multiplexers, a multi-port memory, or other appropriate circuit. In general, the sub-matrix rotation circuit 104 may handle a small matrix, such as 16×16 matrix. Such a small matrix may have a similar size as an MPEG macroblock.

In general, the original matrix 120 (e.g., the image data or the DVD optical data in a particular sector) may be partitioned into the sub-matrices A-N. In one example, any one of a particular number of sub-matrices A-N may be 16×16 bytes. The sub matrix rotation circuit 104 may pre-rotate the original image data for any one of a particular number of sub-matrices A-N.

Figure 3:
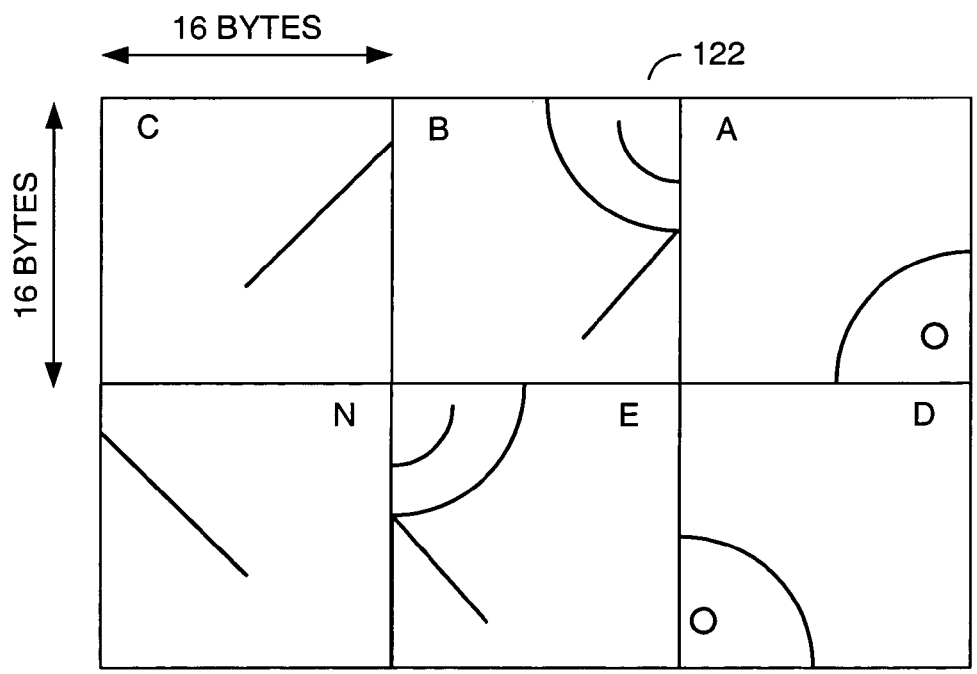
FIG. 3 illustrates an output of a sub-matrix rotator.

Referring to FIG. 3, an output matrix 122 is shown. The output matrix 122 (or a transposed matrix) may be generated by the sub-matrix rotation circuit 104. The output matrix 122 generally comprises final image data which includes a number of lines from the original matrix 120 being rotated 90 degrees in each sub-matrix A-N. The angle of rotation for the final image data in any one of a particular number of sub-matrices A-N may be varied to meet the design criteria of a particular implementation.

Figure 4:
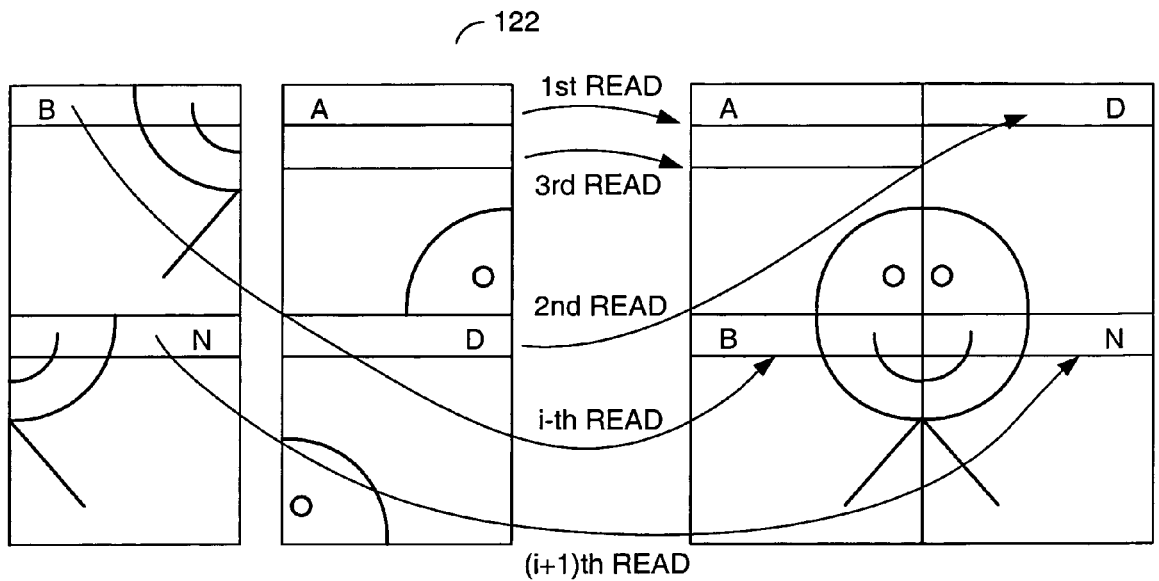
FIG. 4 illustrates a read address sequence.

Referring to FIG. 4, a read address sequence is illustrated for the output matrix 122. A read operation may be performed with an SDRAM address sequence which may assemble an image in the correct raster format. Since read addresses are not linear (particularly with an SRAM), a first row of the sub matrix A is normally read followed by the first row of sub matrix D. In certain circumstances, the read access of sub-matrix A and the read access of sub-matrix B may hit a similar bank, but on different pages of the SDRAM memory 108. SDRAM memories often have 4 banks. Therefore, on average, 25% of the read operation would pay a page hit penalty. Such a page hit penalty may include pre-charging a bank after reading the row from sub matrix A, but before reading the sub matrix B. The page hit penalty encountered normally decreases the overall bandwidth of the memory system. A solution to the page hit penalty may involve arranging the memory 108 into a "tile structure".

The controller 106 and the memory 108 may be implemented to support a tile structure implementation. The memory 108 may be organized in the tile structure. By writing and reading to the memory 108 in a tile structure address sequence, the system 100 may re-assemble the entire picture of the original image data. Normally, a DVD player or a digital recorder includes the memory controller 106 and the memory circuit 108, which may be implemented as high speed circuits. In one example, the memory 108 may be part of an existing memory for the system 100. The controller 106 and the memory 108 may be used as part of the rotation system. In order to sustain high speed rotation operation, the data may be accessed in a 2D tile structure. By accessing data in a 2D tile structure, the access time is reduced by minimizing page crossing in the memory 108. A page crossing normally creates a performance hit as each DRAM page needs to be precharged.

The line buffer circuit 102, the sub-matrix rotation circuit 104, the memory controller 106 and the SDRAM memory 108 provide a pipeline operation. The pipelined operation between the line buffer circuit 102, the sub-matrix rotation circuit 104, and the memory system 105 performs the rotation of an entire larger global matrix (e.g., the original matrix 120) in a sequence of (i) a line buffer access, (ii) a sub-matrix rotation and (iii) a tile memory access. The tile access between the controller 106 and the memory 108 may be performed on data in a current sub-matrix A while the rotation of data may be performed on any of the next sub-matrices B-N.

Figure 5:
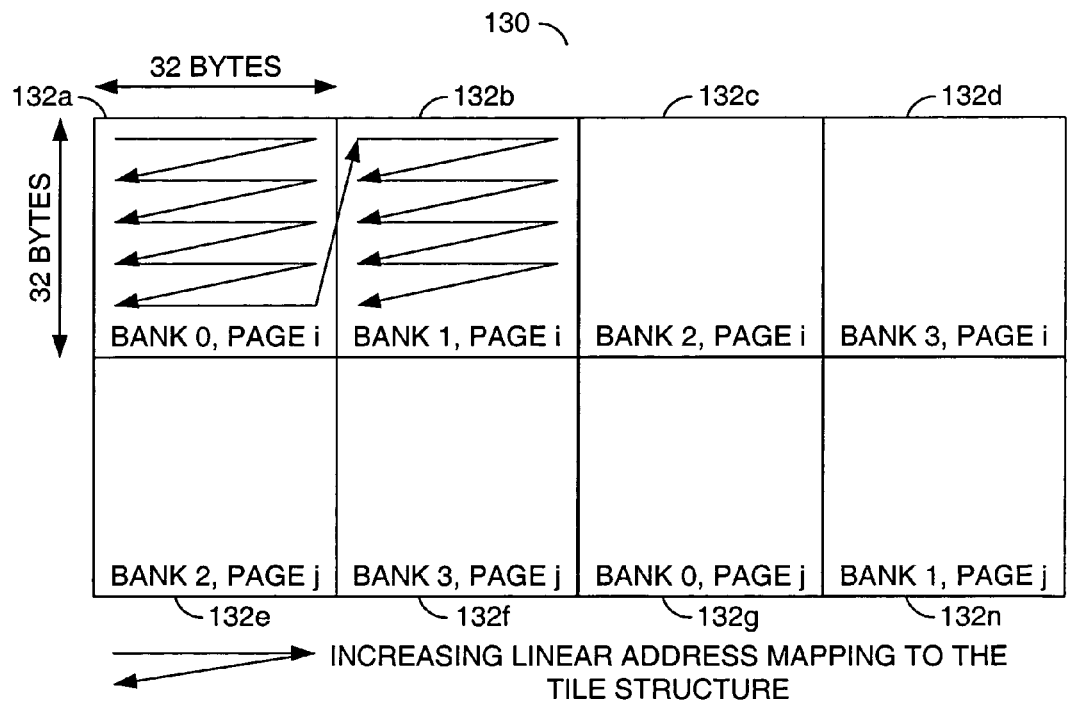
FIG. 5 illustrates another example of a read address sequence.

Referring to FIG. 5, an example of a tile structure 130 is shown. The tile structure 130 generally comprises a number of tiles 132a-132n. Different memory configurations may be implemented to ensure that neighboring tiles are from different banks of the SDRAM memory 108. In one example, the memory 108 may be implemented as an SDRAM memory. Any one of a particular number of the tiles 130a-130n may occupy one page of the memory 108. Each page may be implemented as a 1 K byte page, a 2 K byte page, or other appropriate page size. In one example, a 1 K byte per page memory 108 may allow any one of a particular number of tiles to be 32 bytes by 32 bytes. The tile structure 130 allows the read access of the sub-matrix A and the sub-matrix B to avoid accessing the same bank at the same time. With the tile structure 130, data from the same rows of the sub matrix A and the sub matrix D are either on a same tile, or from tiles in different banks. When jumping back and forth between the sub matrix A and the sub matrix D during a read access operation, a page pre-charge penalty may be avoided. The tile structure memory 130 may reconstruct the original image data into a final raster image on the output matrix 122. The tile structure memory 130 generally provides higher performance than a linear addressing scheme. The present invention may be implemented using a number of memory configurations. The particular type of memory configuration may be varied to meet the design criteria of a particular implementation. In general, the overall performance may be lower if a linear address SDRAM structure is used. With such a linear address structure, every row of image data may be placed randomly on a different bank and the image data may collide. For transpose operations on a smaller matrix, an internal memory may be used instead of external memory. The sub matrix rotation circuit 104 may be using a multi-port memory, or a plurality of registers and multiplexers.

Figure 6:
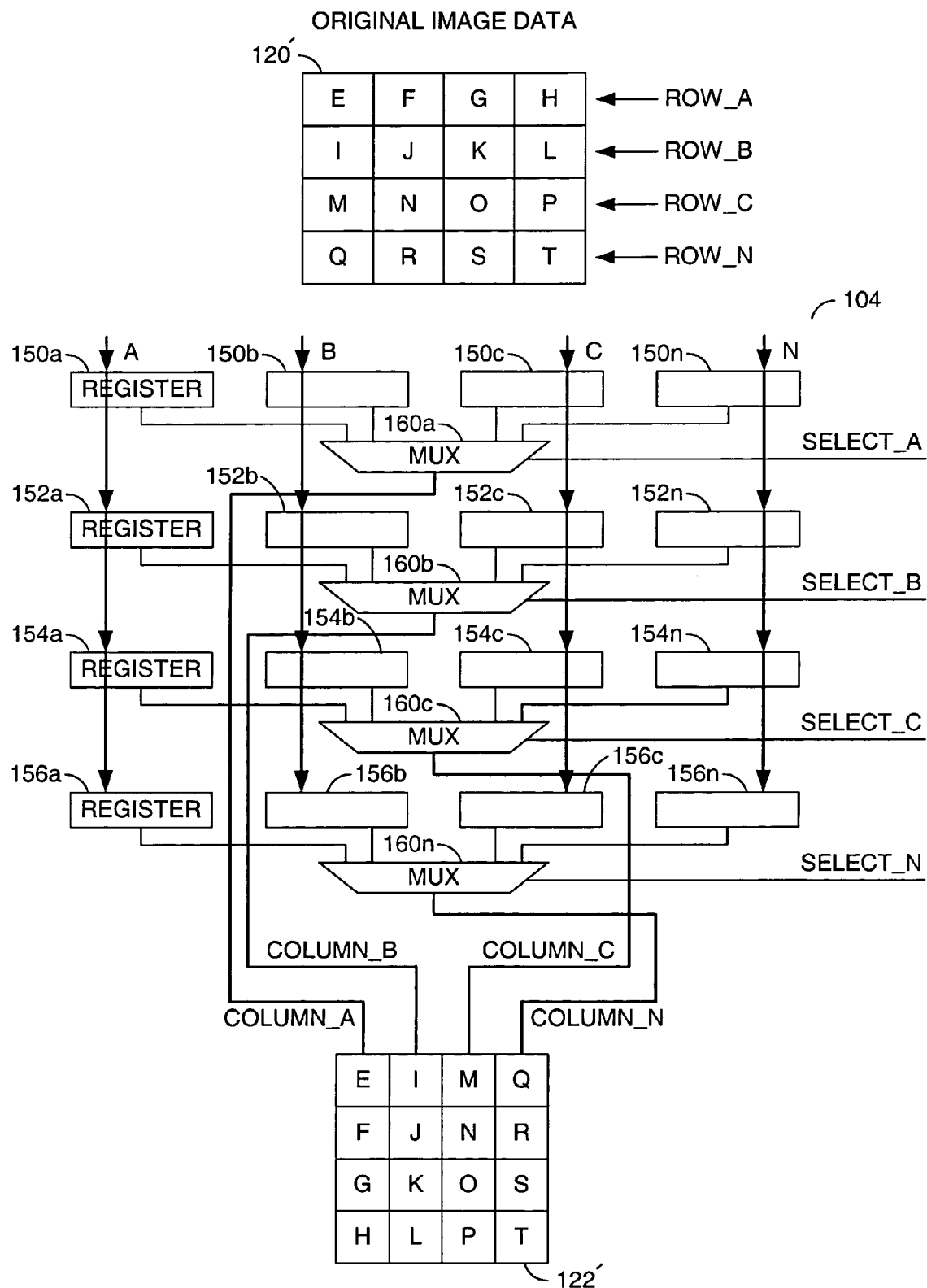
FIG. 6 illustrates a sub-matrix rotation.

Referring to FIG. 6, a more detailed diagram of sub-matrix rotation circuit 104 is shown. The sub-matrix rotation circuit 104 generally comprises a number of registers 150a-150n, a number of registers 152a-152n, a number of registers 154a-154n, a number of registers 156a-156n, a multiplexer 160a, a multiplexer 160b, a multiplexer 160c, and a multiplexer 160n. An original matrix 120' may be presented to the sub-matrix rotation circuit 104. The original matrix 120' generally comprises original image data which may be positioned in a number of rows ROW_A-ROW_N. The original matrix 120' may be generated by the line buffer circuit 102. The original matrix 120' may present original image data to the registers 150a-150n. The sub-matrix rotation circuit 104 may present rotated data to an output matrix 122'. The output matrix 122' generally comprises rotated image data which may be positioned in a number of columns COLUMN_A-COLUMN_N.

The original image data in ROW_A may be received by the registers 150a-150n. In one example, a select signal (e.g., SELECT_A) may select any one of the original data stored in the registers 150a-150n with the multiplexer 160a. Any one of the selected data from the registers 150a-150n may be stored in the COLUMN_A of the output matrix 122'. The original image data in ROW_B may be received by the registers 152a-152n. In one example, a select signal (e.g., SELECT_B) may select any one of the original data stored in the registers 152a-152n with the multiplexer 160b. Any one of the selected data from the registers 152a-152n may be stored in the COLUMN_B of the output matrix 122'.

The original image data in ROW_C may be received by the registers 154a-154n. In one example, a select signal (e.g., SELECT_C) may select any one of the original data stored in the registers 154a-154n with the multiplexer 160c. Any one of the selected data from the registers 154a-154n may be stored in the COLUMN_C of the output matrix 122'. The original image data in ROW_N may be received by the registers 156a-156n. In one example, a select signal (e.g., SELECT_C) may select any one of the original data stored in the registers 156a-156n with the multiplexer 160n. Any one of the selected data from the registers 156a-156n may be stored in COLUMN_N of the output matrix 122'.

The present invention may (i) provide useful matrix manipulation for a two dimensional image, (ii) be used for video, optical and/or two dimensional matrix which needs to be rotated and/or (iii) rotate and/or mirror image data.

The function performed by the present invention may be implemented in hardware, software (firmware) or a combination of hardware and software. The present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

The present invention may be applied for all kind of CD optical discs (e.g., CD-ROM, CD-R, CD-RW, etc.) as well as DVD-ROM, DVD-R, DVD-RW, DVD+R, DVD+RW. The present invention may also be applicable to next generation optical discs (e.g., Blue-Ray discs and HD-DVD).

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a buffer circuit configured to store original image data in a plurality of sub-matrices, wherein said sub-matrices (i) comprise uniform divisions of said original image data and (ii) are configured to be rotated independently of said original image data;
   a rotation circuit comprising a plurality of memory registers and a plurality of multiplexers configured to (i) produce rotated data for each of said sub-matrices by independently rotating each of said sub-matrices by a predetermined angle in response to a plurality of selection signals corresponding to said plurality of multiplexers, (ii) maintain said sub-matrices in a predetermined position, wherein said predetermined position comprises the portion of said original image data corresponding to each of said sub-matrices, and (iii) store said rotated data in a transposed matrix, wherein each of said sub-matrices remains in said predetermined position; and
   a memory comprising a plurality of memory banks, wherein (i) said memory banks are configured to position said rotated data in said transposed matrix, (ii) storage of said rotated data in said plurality of memory banks is configured such that simultaneous read operations of said rotated data do not access any one of said memory banks at the same time, and (iii) said transposed matrix comprises final image data rotated by said predetermined angle from said original image data.

2. The apparatus according to claim 1, wherein said memory comprises a tiled structure memory configured to reconstruct a final raster image having a higher performance than a linear addressing memory scheme.

3. The apparatus according to claim 2, wherein said memory comprises (i) an external synchronous dynamic random access memory (SDRAM) and (ii) an SDRAM controller configured to support said tiled structured memory.

4. The apparatus according to claim 2, wherein said buffer circuit, said rotation circuit and said memory provides a pipelined operation configured to perform the rotation of an entire larger global matrix in a sequence of (i) a line buffer access, (ii) a sub-matrix rotation and (iii) a tile memory access.

5. The apparatus according to claim 1, wherein said buffer circuit comprises a line buffer circuit configured to store enough lines for said rotation circuit to rotate a small sub-matrix.

6. The apparatus according to claim 1, wherein said rotation circuit comprises a sub-matrix rotation circuit configured to rotate a larger two-dimensional matrix by breaking said two-dimensional matrix into said plurality of sub-matrices.

7. The apparatus according to claim 1, wherein said buffer circuit, said rotation circuit and said memory provide an efficient and high speed two-dimensional transpose engine for a system on a chip (SOC) application.

8. The apparatus according to claim 1, wherein said predetermined angle comprises ninety degrees.

9. An apparatus comprising:
   means for storing original image data in a plurality of sub-matrices, wherein said sub-matrices (i) comprise uniform divisions of said original image data and (ii) are configured to be rotated independently of said original image data;
   means for (i) providing rotated data via a plurality of memory registers and a plurality of multiplexers for each of said sub-matrices by independently rotating each of said sub-matrices by a predetermined angle in response to a plurality of selection signals corresponding to said plurality of multiplexers, wherein said predetermined angle comprises ninety degrees, and (ii) maintaining said sub-matrices in a predetermined position, wherein said predetermined position comprises the portion of said original image data corresponding to each of said sub-matrices;
   means for storing said rotated data in a transposed matrix, wherein (i) each of said sub-matrices remains in said predetermined position, (ii) said rotated data is stored in a memory comprising a plurality of memory banks, and (iii) said plurality of memory banks are configured such that simultaneous read operations of said rotated data do not access any one of said memory banks at the same time; and means for positioning said rotated data in said transposed matrix, wherein said transposed matrix comprises final image data rotated by said predetermined angle from said original image data.

10. A method for transposing two-dimensional data, comprising the steps of:

(A) storing original image data in plurality of sub-matrices, wherein said sub-matrices (i) comprise uniform divisions of said original image data and (ii) are configured to be rotated independently of said original image data;

(B) generating rotated data via a plurality of memory registers and a plurality of multiplexers in response to said original stored image data for each of said sub-matrices by (i) independently rotating each of said sub-matrices by a predetermined angle in response to a plurality of selection signals corresponding to said plurality of multiplexers, wherein said predetermined angle comprises ninety degrees, and (ii) maintaining said sub-matrices in a predetermined position, wherein said predetermined position comprises the portion of said original image data corresponding to each of said sub-matrices;

(C) storing said rotated data in a transposed matrix, wherein (i) each of said sub-matrices remains in said predetermined position, (ii) said rotated data is stored in a memory comprising a plurality of memory banks, and (iii) said plurality of memory banks are configured such that simultaneous read operations of said rotated data do not access any one of said memory banks at the same time; and (D) positioning said rotated data in said transposed matrix, wherein said transposed matrix comprises final image data rotated by said predetermined angle from said original image data.

11. The method according to claim 10, wherein step (D) further comprises the step of:

implementing a tile structure memory to reconstruct a final raster image of said original image data, wherein said tile structure memory provides higher performance than a linear addressing memory scheme.

12. The method according to claim 11, further comprising the step of:

avoiding access to a similar memory bank at the same time with said tile structure memory during a read access operation.

13. The method according to claim 11, further comprising the step of:

implementing said tile structure memory to ensure that two or more banks do not share a similar page.

14. The method according to claim 10, further comprising the step of:

performing steps (A)-(D) in a pipelined operation.

15. The method according to claim 14, wherein step (B) further comprises the step of:

breaking down a larger two-dimensional matrix into small sub-matrices.

16. The method according to claim 10, further comprising the step of:

providing an efficient and high speed two-dimensional data transpose engine for a system on a chip (SOC) application.

* * * * *